April 2, 1957 R. GEIGER 2,787,297
APPARATUS FOR TEMPORARILY SUPPORTING WORK PIECES
OF DUPLICATING MACHINES AND THE LIKE
Filed Aug. 12, 1953 2 Sheets-Sheet 1
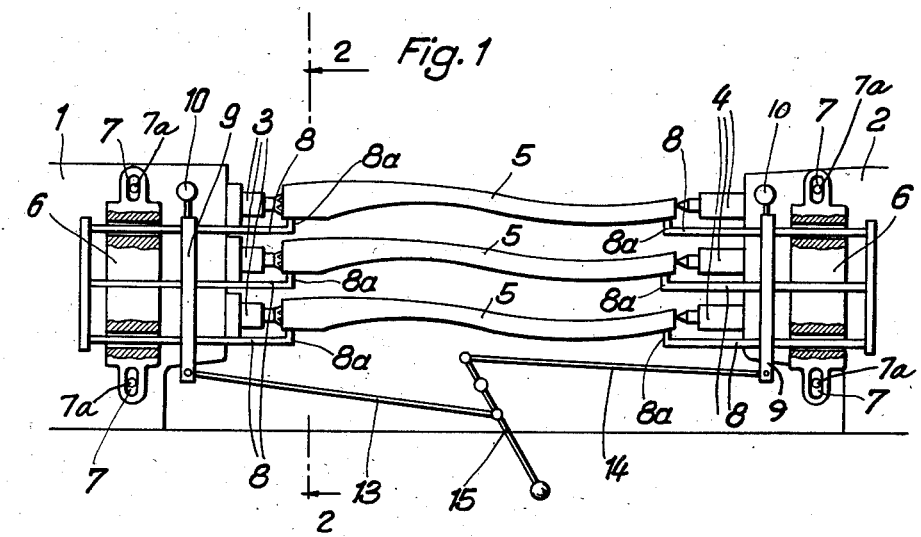
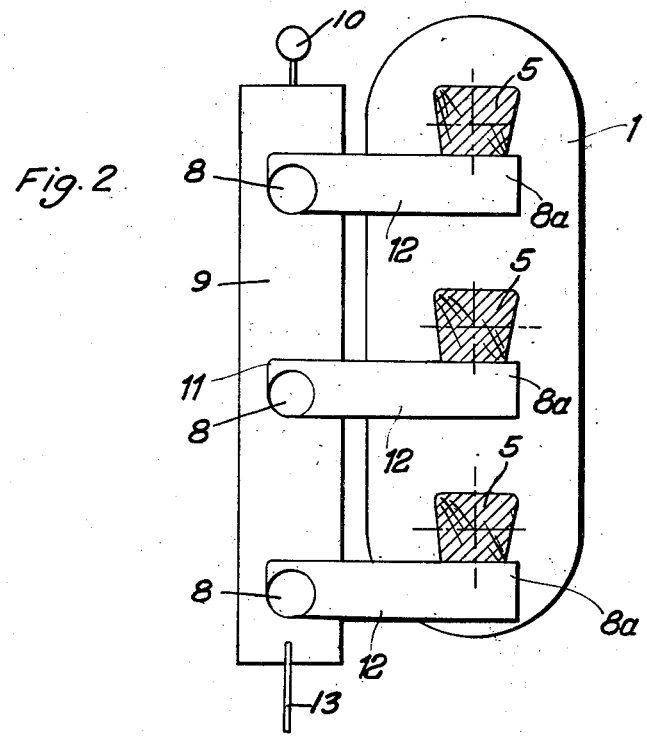
Inventor:
ROLF GEIGER
BY:

April 2, 1957  R. GEIGER  2,787,297
APPARATUS FOR TEMPORARILY SUPPORTING WORK PIECES
OF DUPLICATING MACHINES AND THE LIKE
Filed Aug. 12, 1953  2 Sheets-Sheet 2

Inventor:
ROLF GEIGER
BY

United States Patent Office 2,787,297
Patented Apr. 2, 1957

2,787,297

APPARATUS FOR TEMPORARILY SUPPORTING WORK PIECES OF DUPLICATING MACHINES AND THE LIKE

Rolf Geiger, Ludwigshafen (Rhine), Germany

Application August 12, 1953, Serial No. 373,856

Claims priority, application Germany October 25, 1952

15 Claims. (Cl. 142—55)

The present invention relates to duplicating machines and the like.

More particularly, the present invention relates to an apparatus for temporarily supporting work pieces until they are engaged and carried by the spindles of the duplicating machine.

Certain known duplicating machines have independently movable spindles which are separately moved to engage the work pieces, but such machines require a great deal of time and labor to set up. Therefore, it has been proposed to provide the head and tail stock assemblies of such machines with spindles which are simultaneously movable so that all of the work pieces may be simultaneously engaged by the spindles. This results in a great saving of time and labor but creates the problem of supporting the work pieces simultaneously in a position where they may all be simultaneously engaged by the spindles. Although certain known devices are capable of temporarily supporting the work pieces for such simultaneous engagement with the spindles, these known devices invariably are of a complicated and elaborate construction requiring a great deal of space and are generally swingable from the front of the machine to a position between the spindles so that space is required for the movement of these known devices as well as for the device itself.

One of the objects of the present invention is to provide an apparatus, for temporarily supporting the work pieces, which does not require a great deal of space and which does not swing from a position in front of the machine to a position between the spindles.

A further object of the present invention is to provide an exceedingly simple apparatus for temporarily supporting the work pieces.

Another object of the present invention is to provide a means for adjusting an apparatus for temporarily supporting the work pieces so that the apparatus may be used with different types of work pieces.

An additional object of the present invention is to provide a means for simultaneously moving temporary work piece supporting devices respectively associated with the head and tail stock assemblies of a duplicating machine.

With the above objects in view, the present invention mainly consists of a duplicating machine provided with head and tail stock assemblies each of which has a plurality of spindles for supporting work pieces. All of these spindles are located in a single predetermined plane, and a pair of support means are respectively mounted on the head and tail stock assemblies for movement in a second plane parallel to this predetermined plane, the pair of support means each having a plurality of carriers equal in number to the number of spindles on each assembly for temporarily supporting a plurality of work pieces while they are being mounted on the spindles.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagrammatic front view of a duplicating machine provided with the apparatus of the invention;

Fig. 2 is a side elevational view, partly in section, taken substantially along line 2—2 of Fig. 1;

Figure 3:
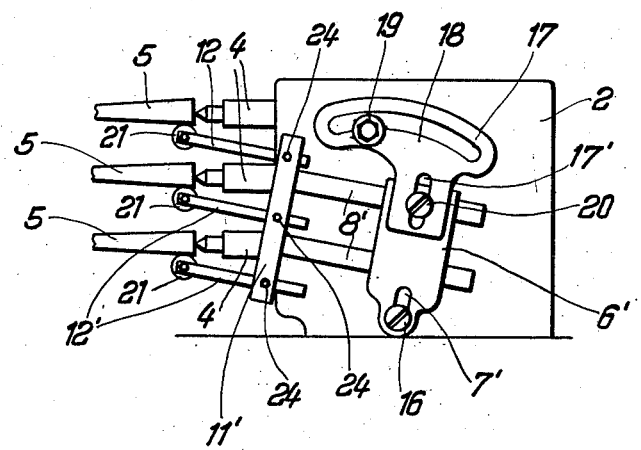
Fig. 3 is a fragmentary diagrammatic front view of a different type of support apparatus constructed in accordance with the present invention.

Referring now to the drawings, it will be seen that the duplicating machine includes a head stock assembly 1 and a tail stock assembly 2. In the example illustrated, the head stock assembly 1 is provided with three spindles 3, and the tail stock assembly 2 is provided with three spindles 4 respectively located opposite the spindles 3, all of these spindles being located in a single plane. The work pieces 5 are adapted to be carried in the usual way by the spindles 3 and 4, as shown in Fig. 1.

The spindles 3 and 4 are simultaneously movable toward and away from the work pieces 5, and in accordance with the present invention a pair of support means are respectively mounted on the head and tail stock assemblies 1 and 2 to temporarily carry the work pieces 5 until they are engaged by the spindles 3 and 4. This pair of support means includes a pair of blocks 6 respectively fixed to the head and tail stock assemblies 1 and 2 through the medium of screws 7a extending through the slots 7 of each block 6. These slots 7 extend in a substantially vertical direction, as shown in Fig. 1, so that the screws extending therethrough may be loosened to enable the blocks 6 to be adjusted in elevation so that these slots 7 and screws passing therethrough form an adjusting means for the support means.

Each of the blocks 6 is provided with three bores located in a plane parallel to that in which the spindles 3 and 4 are located, and a rod 8 extends through each of these bores for reciprocating movement therein, these rods being equal in number to the number of spindles of each assembly. Each set of rods is connected together for simultaneous reciprocating movement with respect to the block supporting the same, as, for example, through the medium of a bar 9 which is fixed to the three rods of each set and which has a handle 10 so that each set of rods may be simultaneously moved by the operator. At their free ends the rods are respectively connected to carriers 8a which extend transversely in a direction normal to the planes in which the spindles 3, 4 and the rods 8 are located, as is clearly illustrated in Fig. 2. The carriers 8a are respectively located at a lower level than the several spindles and are movable with the rods from an operating position in front of the spindles, as shown in Fig. 1, to a rest position located behind the free ends of the spindles. Thus, when the parts are in the position shown in Fig. 1, the work pieces 5 may be temporarily supported by the carriers 8a until the spindles 3 and 4 engage the work pieces, and then the sets of carriers 8a may be moved away from each other to the above-mentioned rest position out of engagement with the work pieces.

As was mentioned above, the handles 10 may be used to move the rods 8. However, a moving means may be provided to simultaneously move the pair of support means toward and away from each other, and in Fig. 1 such a moving means is shown as including a pair of bars 13 and 14 which are respectively pivotally connected to the bars 9, as shown in Fig. 1. The bars 13 and 14 are pivotally connected at their opposite ends respectively to portions of a lever 15 which are respectively located on opposite sides of an intermediate part of lever 15 which is pivotally connected to the machine for turning movement about an axis normal to the planes in which the rods 8 and spindles 3, 4 are located. It is evident that upon turning of the lever 15 the sets of rods 8 and carriers 8a will be moved toward or away from each other.

It frequently happens that the ends of the work pieces are conical, and the embodiment of the invention which is shown in Fig. 3 is particularly suited for use with such work pieces. As is shown in Fig. 3, only the support means associated with the tail stock assembly is illustrated, but it is to be understood that the support means associated with the head stock assembly may be of the same construction if desired. According to Fig. 3, the block 6' is provided with a slot 7' through which a screw 16 extends to adjustably fix the block 6' to the tail stock assembly 2, and, as is evident from Fig. 3, the block 6' may turn about the axis of screw 16 and is adjustable in elevation with respect to the screw 16.

An extension 17 is provided with a slot 17' and is fixed to the block 6' through the medium of a screw 20 extending through the slot 17' of extension 17 which is formed with an elongated curved slot 18 through which the screw 19 extends for fixing the extension 17 and block 6' to the tail stock assembly 2 in a desired angular position. Although the extension 17 turns, it does not change its elevation, and the screws 20 and 16 are both loosened when the block 6' is adjusted in elevation so that this block 6' is adjustable both with respect to the tail stock assembly 2 and the extension 17.

Figure 4:
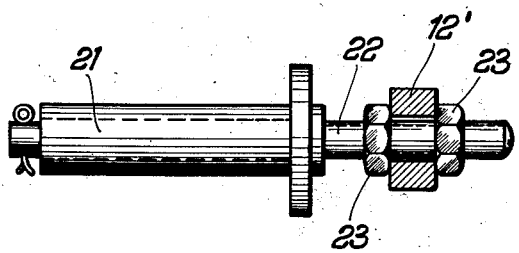
Fig. 4 is a partly sectional view on an enlarged scale of a detail of the apparatus of Fig. 3.

The block 6' is formed with bores through which the rods 8' extend, and these rods 8' are connected to each other at their left free end, as viewed in Fig. 3, through the medium of a bar 11' which is itself formed with bores through which the arms 12' respectively extend. Set screws 24 fix the arms 12' to the bar 11', and these set screws may be independently loosened to independently adjust the arms 12'. As is most clearly shown in Fig. 4, each arm 12' is formed with a bore through which a stud 22 extends, this stud 22 being threaded at its right end portion, as viewed in Fig. 4, to receive the nuts 23 for fixing the stud 22 to each arm 12', and each stud 22 turnably supports a roller 21 which is adapted to engage a conical end of a work piece as shown in Fig. 3.

Thus, the apparatus of Fig. 3 may be angularly adjusted to the conicity of the work pieces so that the rollers 21 may move along the ends of the work pieces, and the rods 8' together with the parts connected thereto may be reciprocated with respect to the block 6' either by hand or through a linkage such as that described above in connection with Fig. 1. It is evident that the nuts 23 permit the stud 22 and the roller 21 therewith to be adjusted with respect to each arm 12'.

The operation of the device is as follows:

If it is desired to mount work pieces onto the spindles, the carriers (8, 8a in Figs. 1 and 2 and 11', 12', 21 in Fig. 3) are moved to their operative positions in front of their respective spindles. As shown in Fig. 1, this may be accomplished by rotating the lever 15 in a counter-clockwise direction. The work pieces 5 may then be placed onto the carriers and brought into engagement with the head stock spindles 3. The tail stock spindles 4 may then be moved, either separately or together, toward the work pieces so that the work pieces will be firmly held by both the head stock spindles 3 and the tail stock spindles 4. The carriers may then be moved to their rest positions by rotating the lever 15 in a clockwise direction so that the carriers will be out of engagement with the work pieces 5.

It will be understood that each of the elements described above, or two or more together, may also find a useful application in other types of duplicating machines differing from the types described above.

While the invention has been illustrated and described as embodied in apparatus for temporarily supporting the work pieces of duplicating machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a duplicating machine, in combination, a head stock assembly and a tail stock assembly each having a plurality of spindles for supporting work pieces, the axes of all of said spindles being located in a predetermined plane; and a pair of support means respectively mounted on said head and tail stock assemblies for movement in a second plane parallel to said predetermined plane, each of said support means having a plurality of carriers equal in number to the number of spindles on each of said assemblies and being movable in a direction parallel to the axes of said spindles to and from an operative position wherein said carriers are respectively located in planes below the axes of and in front of the spindles of the respective assembly on which each of said support means is mounted whereby said carriers may when said support means are in their operative positions temporarily support a plurality of work pieces while they are being mounted on said spindles.

2. In a duplicating machine, in combination, a head stock assembly and a tail stock assembly each having a plurality of spindles for supporting work pieces, the axes of all of said spindles being located in a predetermined plane; and a pair of support means respectively mounted on said head and tail stock assemblies for movement in a second plane parallel to said predetermined plane, each of said support means having a plurality of carriers equal in number to the number of spindles on each of said assemblies and being movable to and from an operative position wherein said carriers are respectively located in planes below and in front of the spindles of the respective assembly on which each of said support means is mounted whereby said carriers may when said support means are in their operative positions temporarily support a plurality of work pieces while they are being mounted on said spindles, and said pair of support means being respectively connected to said assemblies for adjustable turning movement respectively about a pair of axes normal to said planes so that said carrier members may move along paths inclined to the axes respectively extending between the spindles of said head stock assembly and the spindles of said tail stock assembly.

3. In a duplicating machine, in combination, a head stock assembly and a tail stock assembly each having a plurality of spindles for supporting work pieces, all of said spindles being located in a predetermined plane; a pair of support means respectively mounted on said head and tail stock assemblies for movement in a second plane parallel to said predetermined plane, each of said support means having a plurality of carriers equal in number to the number of spindles on each of said assemblies and being movable in a direction parallel to the axes of said spindles to and from an operative position wherein said carriers are respectively located in planes below the axes of and in front of the spindles of the respective assembly on which each of said support means is mounted whereby said carriers may when said support means are in their operative positions temporarily support a plurality of work pieces while they are being mounted on said spindles; and adjusting means operatively connected to said pair of support means for adjusting the elevation thereof.

4. In a duplicating machine, in combination, a head stock assembly and a tail stock assembly each having a plurality of spindles for supporting work pieces, all of said spindles being located in a predetermined plane; a pair of support means respectively mounted on said head and tail stock assemblies for movement in a second plane parallel to said predetermined plane, each of said support means having a plurality of carriers equal in number to the number of spindles on each of said assemblies and being movable to and from an operative position wherein said carriers are respectively located in planes below and in front of the spindles of the respective assembly on which each of said support means is mounted whereby said carriers may when said support means are in their operative positions temporarily support a plurality of work pieces while they are being mounted on said spindles, and said pair of support means being respectively connected to said assemblies for adjustable turning movement respectively about a pair of axes normal to said planes so that said carrier members may move along paths inclined to the axes respectively extending between the spindles of said head stock assembly and the spindles of said tail stock assembly; and adjusting means operatively connected to said pair of support means for adjusting the elevation thereof.

5. In a duplicating machine, in combination, a head stock assembly and a tail stock assembly each having a plurality of spindles for supporting work pieces, the axes of all of said spindles being located in a predetermined plane; and a pair of support means respectively mounted on said head and tail stock assemblies for movement in a second plane parallel to said predetermined plane, each of said support means having a plurality of carriers equal in number to the number of spindles on each of said assemblies and being movable in a direction parallel to the axes of said spindles to and from an operative position wherein said carriers are respectively located in planes below the axes of and in front of the spindles of the respective assembly on which each of said support means is mounted whereby said carriers may when said support means are in their operative positions temporarily support a plurality of work pieces while they are being mounted on said spindles, said carriers having rollers for contacting work pieces located between said spindles.

6. In a duplicating machine, in combination, a head stock assembly and a tail stock assembly each having a plurality of spindles for supporting work pieces, all of said spindles being located in a predetermined plane; and a pair of support means respectively mounted on said head and tail stock assemblies for movement in a second plane parallel to said predetermined plane, each of said support means having a plurality of carriers equal in number to the number of spindles on each of said assemblies and being movable to and from an operative position wherein said carriers are respectively located in planes below and in front of the spindles of the respective assembly on which each of said support means is mounted whereby said carriers may when said support means are in their operative positions temporarily support a plurality of work pieces while they are being mounted on said spindles, said carriers having rollers for contacting work pieces located between said spindles, and said pair of support means being respectively connected to said assemblies for adjustable turning movement respectively about a pair of axes normal to said planes so that said carrier members may move along paths inclined to the axes respectively extending between the spindles of said head stock assembly and the spindles of said tail stock assembly.

7. In a duplicating machine, in combination, a head stock assembly and a tail stock assembly each having a plurality of spindles for supporting work pieces, all of said spindles being located in a predetermined plane; a pair of support means respectively mounted on said head and tail stock assemblies for movement in a second plane parallel to said predetermined plane, each of said support means having a plurality of carriers equal in number to the number of spindles on each of said assemblies and being movable to and from an operative position wherein said carriers are respectively located in planes below and in front of the spindles of the respective assembly on which each of said support means is mounted whereby said carriers may when said support means are in their operative positions temporarily support a plurality of work pieces while they are being mounted on said spindles, said carriers having rollers for contacting work pieces located between said spindles, and said pair of support means being respectively connected to said assemblies for adjustable turning movement respectively about a pair of axes normal to said planes so that said carrier members may move along paths inclined to the axes respectively extending between the spindles of said head stock assembly and the spindles of said tail stock assembly; and adjusting means operatively connected to said pair of support means for adjusting the elevation thereof.

8. In a duplicating machine, in combination, a head stock assembly and a tail stock assembly each having a plurality of spindles for supporting work pieces, the axes of all of said spindles being located in a predetermined plane; a pair of support means respectively mounted on said head and tail stock assemblies for movement in a second plane parallel to said predetermined plane, each of said support means having a plurality of carriers equal in number to the number of spindles on each of said assemblies and being movable in a direction parallel to the axes of said spindles to and from an operative position wherein said carriers are respectively located in planes below the axes of and in front of the spindles of the respective assembly on which each of said support means is mounted whereby said carriers may when said support means are in their operative positions temporarily support a plurality of work pieces while they are being mounted on said spindles; and a plurality of adjusting means operatively connected to said carriers, respectively, for independently adjusting the same.

9. In a duplicating machine, in combination, a head stock assembly and a tail stock assembly each having a plurality of spindles for supporting work pieces, all of said spindles being located in a predetermined plane; a pair of support means respectively mounted on said head and tail stock assemblies for movement in a second plane parallel to said predetermined plane, each of said support means having a plurality of carriers equal in number to the number of spindles on each of said assemblies and being movable to and from an operative position wherein said carriers are respectively located in planes below and in front of the spindles of the respective assembly on which each of said support means is mounted whereby said carriers may when said support means are in their operative positions temporarily support a plurality of work pieces while they are being mounted on said spindles, and said pair of support means being respectively connected to said assemblies for adjustable turning movement respectively about a pair of axes normal to said planes so that said carrier members may move along paths inclined to the axes respectively extending between the spindles of said head stock assembly and the spindles of said tail stock assembly; and a plurality of adjusting means operatively connected to said carriers, respectively, for independently adjusting the same.

10. In a duplicating machine, in combination, a head stock assembly and a tail stock assembly each having a plurality of spindles for supporting work pieces, the axes of all of said spindles being located in a predetermined plane; and a pair of support means respectively mounted on said head and tail stock assemblies for movement in a second plane parallel to said predetermined plane, each of said support means having a plurality of carriers equal in number to the number of spindles on each of said assemblies and being movable in a direction parallel to the axes of said spindles to and from an operative position wherein said carriers are respectively located in planes below the axes of and in front of the spindles of the respective assembly on which each of said support means is mounted whereby said carriers may when said support means are in their operative positions temporarily support a plurality of work pieces while they are being mounted on said spindles, said carriers being removable from said support means so that they may be replaced with other carriers.

11. In a duplicating machine, in combination, a head stock assembly and a tail stock assembly each having a plurality of spindles for supporting work pieces, the axes of all of said spindles being located in a predetermined plane; a pair of support means respectively mounted on said head and tail stock assemblies for movement in a second plane parallel to said predetermined plane, each of said support means having a plurality of carriers equal in number to the number of spindles on each of said assemblies and being movable in a direction parallel to the axes of said spindles to and from an operative position wherein said carriers are respectively located in planes below the axes of and in front of the spindles of the respective assembly on which each of said support means is mounted whereby said carriers may when said support means are in their operative positions temporarily support a plurality of work pieces while they are being mounted on said spindles; and moving means connected to said pair of support means to simultaneously move same toward and away from each other.

12. In a duplicating machine, in combination, a head stock assembly and a tail stock assembly each having a plurality of spindles for supporting work pieces, all of said spindles being located in a predetermined plane; and a pair of support means respectively mounted on said head and tail stock assemblies for movement in a second plane parallel to said predetermined plane and each having a plurality of carriers equal in number to the number of spindles on each of said assemblies for temporarily supporting a plurality of work pieces while they are being mounted on said spindles, said pair of support means respectively including a pair of blocks respectively fixed to said head and tail stock assemblies, said blocks each being formed with a plurality of bores located in said second plane and being substantially parallel to said spindles, and a plurality of rods respectively extending slidably through said bores, said rods being connected to each other for simultaneous movement in said second plane and said rods being connected to said carriers, said carriers extending in a direction normal to said planes and being respectively located at a lower elevation than said spindles and being movable between an operating position in front of said spindles and a rest position to the rear of said spindles, so that work pieces may be temporarily carried by said carriers when the latter are in said operating position thereof.

13. In a duplicating machine, in combination, a head stock assembly and a tail stock assembly each having a plurality of spindles for supporting work pieces, all of said spindles being located in a predetermined plane; and a pair of support means respectively mounted on said head and tail stock assemblies for movement in a second plane parallel to said predetermined plane and each having a plurality of carriers equal in number to the number of spindles on each of said assemblies for temporarily supporting a plurality of work pieces while they are being mounted on said spindles, said pair of support means respectively including a pair of blocks respectively fixed to said head and tail stock assemblies, said blocks each being formed with a plurality of bores located in said second plane and being substantially parallel to said spindles, and a plurality of rods respectively extending slidably through said bores, said rods being connected to each other for simultaneous movement in said second plane and said rods being connected to said carriers, said carriers extending in a direction normal to said planes and being respectively located at a lower elevation than said spindles and being movable between an operating position in front of said spindles and a rest position to the rear of said spindles, so that work pieces may be temporarily carried by said carriers when the latter are in said operating position thereof, said blocks each having at least one slot extending in a substantially vertical direction and being fixed to said assemblies through the medium of screw members respectively extending through said slots and engaging said assemblies, so that said blocks may be adjusted in elevation upon loosening of said screw members.

14. In a duplicating machine, in combination, a head stock assembly and a tail stock assembly each having a plurality of spindles for supporting work pieces, all of said spindles being located in a predetermined plane; a pair of support means respectively mounted on said head and tail stock assemblies for movement in a second plane parallel to said predetermined plane and each having a plurality of carriers equal in number to the number of spindles on each of said assemblies for temporarily supporting a plurality of work pieces while they are being mounted on said spindles, said pair of support means respectively including a pair of blocks respectively fixed to said head and tail stock assemblies, said blocks each being formed with a plurality of bores located in said second plane and being substantially parallel to said spindles, and a plurality of rods respectively extending slidably through said bores, said rods being connected to each other for simultaneous movement in said second plane and said rods being connected to said carriers, said carriers extending in a direction normal to said planes and being respectively located at a lower elevation than said spindles and being movable between an operating position in front of said spindles and a rest position to the rear of said spindles, so that work pieces may be temporarily carried by said carriers when the latter are in said operating position thereof, said blocks each having at least one slot extending in a substantially vertical direction and being fixed to said assemblies through the medium of screw members respectively extending through said slots and engaging said assemblies, so that said blocks may be adjusted in elevation upon loosening of said screw members; and moving means connected to said pair of support means to simultaneously move same toward and away from each other.

15. In a duplicating machine, in combination, a head stock assembly and a tail stock assembly each having a plurality of spindles for supporting work pieces, all of said spindles being located in a predetermined plane; a pair of support means respectively mounted on said head and tail stock assemblies for movement in a second plane parallel to said predetermined plane and each having a plurality of carriers equal in number to the number of spindles on each of said assemblies for temporarily supporting a plurality of work pieces while they are being mounted on said spindles, said pair of support means respectively including a pair of blocks respectively fixed to said head and tail stock assemblies, said blocks each being formed with a plurality of bores located in said second plane and being substantially parallel to said spindles, and a plurality of rods respectively extending slidably through said bores, said rods being connected to each other for simultaneous movement in said second plane and said rods being connected to said carriers, said carriers extending in a direction normal to said planes and being respectively located at a lower elevation than said spindles and being movable between an operating position in front of said spindles and a rest position to the rear of said spindles, so that work pieces may be temporarily carried by said carriers when the latter are in said operating position thereof, said blocks each having at least one slot extending in a substantially vertical direction and being fixed to said assemblies through the medium of screw members respectively extending through said slots and engaging said assemblies, so that said blocks may be adjusted in elevation upon loosening of said screw members; and moving means connected to said pair of support means to simultaneously move same toward and away from each other, said moving means comprising a pair of bars operatively connected to the rods of said pair of support means, respectively, and a lever turnably mounted as an intermediate portion thereof on the duplicating machine and being pivotally connected to said pair of bars at opposite sides of said intermediate portion, respectively.

References Cited in the file of this patent

UNITED STATES PATENTS

| | | |
|---|---|---|
| 997,269 | Carver | July 11, 1911 |
| 1,246,922 | Hopkins | Nov. 20, 1917 |
| 1,277,203 | Ensign | Aug. 27, 1918 |
| 1,646,115 | Sjostrom | Oct. 18, 1927 |
| 2,382,896 | Medcoff | Aug. 14, 1945 |